H. J. SAUVAGE.
NUTCRACKER.
APPLICATION FILED APR. 28, 1915.
1,222,330.
Patented Apr. 10, 1917.
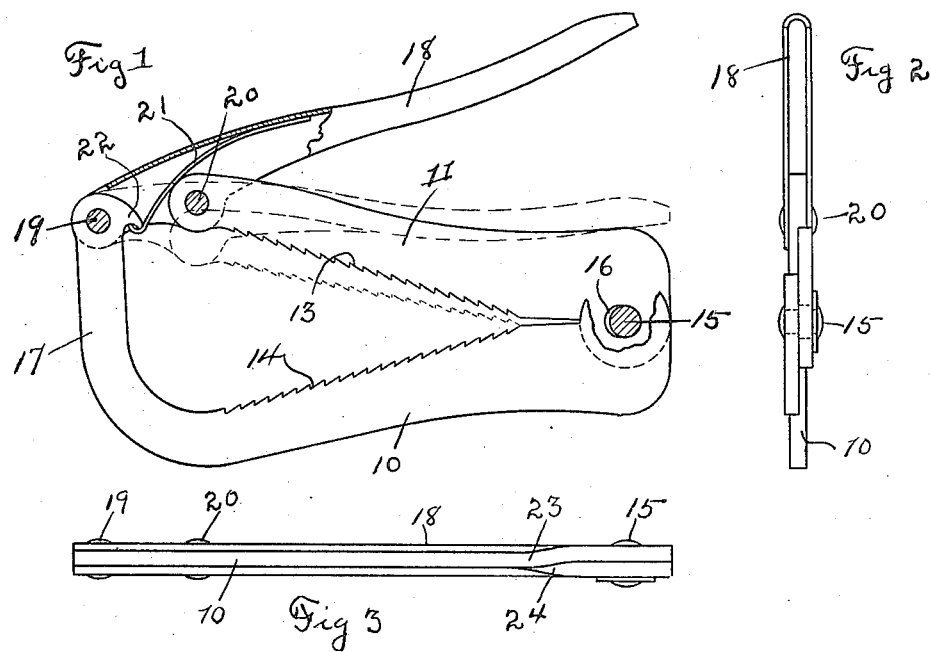
WITNESSES:
INVENTOR.
Herbert J. Sauvage
BY
ATTORNEY.

UNITED STATES PATENT OFFICE.

HERBERT J. SAUVAGE, OF CHICAGO, ILLINOIS.

NUTCRACKER.

1,222,330.

Specification of Letters Patent.

Patented Apr. 10, 1917.

Application filed April 28, 1915. Serial No. 24,394.

*To all whom it may concern:*

Be it known that I, HERBERT J. SAUVAGE, a subject of the King of England, residing at Chicago, in the county of Cook and State of Illinois, have invented certain new and useful Improvements in Nutcrackers, of which the following is a specification.

This invention relates to improvements in nut crackers of the hand type, and one of the objects of the same is to provide an improved simple and efficient device of this character, which will when operating upon a nut, crack the shell without crushing the meat of the nut.

A further object is to provide an improved device of this character, so constructed and arranged as to produce a comparatively long leverage, to the end that a powerful pressure on the nut will result.

To the attainment of these ends and the accomplishment of other new and useful objects, as will appear, the invention consists in the features of novelty in substantially the construction, combination and arrangement of the several parts hereinafter more fully described and claimed and shown in the accompanying drawing illustrating the invention, and in which—

Figure 1 is a side view partly in elevation, partly in section and with parts broken away, of an improved device of this charter constructed in accordance with the principles of this invention and showing the parts in dotted lines, in an adjusted position.

Fig. 2 is a right hand end view of Fig. 1.

Fig. 3 is a bottom view of Fig. 1.

Referring more particularly to the drawings, the numerals 10 and 11 designate two members which are respectively provided with the jaws 13, 14 and are constructed of sheet material. These members are pivotally connected at one end by means of a pivot 15, secured to one of the members and which pivot passes through a slot 16 in the other member to form a loose connection. The member 10 is preferably slightly longer than the member 11, and the forward extremity of the member 10 is shaped to form an extension portion 17, which extends in a direction across the space between the free ends of the members 10 and 11 and terminates short of the extremity of the member 11. An operating lever 18 is provided for manipulating the jaws and this lever 18 is pivotally connected as at 19 with the portion 17 of the member 10. The lever 18 is also pivotally connected as at 20 with the free end of the member 11 so that when the lever 18, which latter preferably extends in a direction toward the pivot 15, is operated, there will be a relative movement between the lever and the respective members 10 and 11 to force the latter together. A spring 21 may be provided, which tends normally to open the jaws 13, 14 and this spring may be held in position in any suitable manner, preferably by one end thereof engaging under a shoulder 22 on the portion 17 of the member 10 and to engage the member 11 and rest against the lever 18.

The jaws 14, 13 are so arranged that they diverge from the pivot 15 toward the other ends of the respective members and the lever 18 is so constructed that when it is operated to move the jaws together, it will abut the member 11 to limit the movement of the jaws and thereby arrest the movement of the jaws so that in operating upon the nut, the shell of the nut will be cracked without crushing the meat of the nut. The pivot 15 and the slot 16 will limit the opening movement of the jaws.

If desired, the portions of the members 10 and 11 adjacent the pivot 15 may be twisted slightly as at 23, 24, so that one of the portions will project over the other to form overlapping shoulders, and these shoulders may be employed, as a means for limiting the inward movement of the jaws.

With this improved construction, it will be manifest that the lever 18 is fixedly connected with each of the jaws 10 and 11, at different points on the lever 18, as contradistinguished from a loose connection such as a pin and slot, thereby insuring a rigid construction and necessitating a comparatively short movement of the jaws, while an increased leverage will be given to the lever 18.

What is claimed as new is:

1. A nut cracker comprising coöperating jaws pivotally connected at one end, a lever, and means fixedly connecting one end of said lever with the other end of each of the members, two of said parts also having a loose connection.

2. A nut cracker comprising coöperating jaws adjustably and pivotally connected at one end, a lever, and means fixedly connecting one end of said lever with the other end of each of the members.

3. A nut cracker comprising coöperating jaws loosely connected together at one end of said jaws, a lever, and means pivotally connecting said lever with the other end of each of the members.

4. A nut cracker comprising coöperating jaws, pivotally connecting together at one end, a lever, means fixedly connecting one end of said lever with the other end of each of the members, and means tending normally to separate the jaws, two of said parts also having a loose connection.

5. A nut cracker comprising coöperating jaws, means slidably and pivotally connecting together one end of said jaws, a lever, means fixedly connecting one end of said lever with the other end of each of the members, and a spring arranged adjacent the point of connection of the lever with the end of the jaws and operating on the lever to normally move the latter in a direction to separate the jaws.

6. A nut cracker comprising two members provided with coöperating jaws, means pivotally connecting the members at one end, a lever arranged at the other end of the members, and means fixedly connecting the other ends of each of the said members with the said lever, said lever extending in a direction toward the pivot of said members, said lever abutting one of said members to limit the movement of the members in directions toward each other, two of said parts also having a loose connection.

7. A nut cracker comprising coöperating jaws, means slidably and pivotally connecting together one end of said jaws, a lever, and means fixedly connecting one end of said lever with the other end of each of the members.

8. A nut cracker comprising coöperating jaws, means slidably and pivotally connecting together one end of said jaws, a lever, and means fixedly connecting one end of said lever with the other end of each of the members, the other end of the lever extending in a direction toward the pivot of said members, said lever abutting one of the said members for limiting the movement of the members toward each other.

9. A nut cracker comprising coöperating jaws, a loose connection between one end of the jaws, a fixed pivotal connection between the other end of one of the jaws and the lever, and a fixed connection between the other end of the other of said members and the lever, the last recited connection embodying a pivot.

10. A nut cracker comprising coöperating jaws, a loose connection between one end of the jaws, a fixed pivotal connection between the other end of one of the jaws and the lever, and a fixed connection between the other end of the other of said members and the lever, the last recited connection embodying a pivot, and a stop to limit the movement of the jaws toward each other.

In testimony whereof I have signed my name to this specification, in the presence of two subscribing witnesses, on this 24th day of April A. D. 1915.

HERBERT J. SAUVAGE.

Witnesses:
FRANK N. REED,
J. H. JOCHUM, Jr.